US009147217B1

(12) United States Patent
Zabritski et al.

(10) Patent No.: US 9,147,217 B1
(45) Date of Patent: Sep. 29, 2015

(54) SYSTEMS AND METHODS FOR ANALYZING LENDER RISK USING VEHICLE HISTORICAL DATA

(75) Inventors: Melinda Zabritski, Santa Ana, CA (US); Miguel Otero, Orlando, FL (US); Jorge N. Diaz, Ovideo, FL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 728 days.

(21) Appl. No.: 13/099,243

(22) Filed: May 2, 2011

(51) Int. Cl.
*G06Q 40/00* (2012.01)
*G06Q 40/02* (2012.01)

(52) U.S. Cl.
CPC .................................... *G06Q 40/025* (2013.01)

(58) Field of Classification Search
None
See application file for complete search history.

(56) References Cited

U.S. PATENT DOCUMENTS

| 4,989,144 | A | 1/1991 | Barnett, III |
| 5,120,704 | A | 6/1992 | Lechter et al. |
| 5,201,010 | A | 4/1993 | Deaton et al. |
| 5,216,612 | A | 6/1993 | Cornett et al. |
| 5,630,070 | A | 5/1997 | Dietrich et al. |
| 5,765,143 | A | 6/1998 | Sheldon et al. |
| 5,819,234 | A | 10/1998 | Slavin et al. |
| 5,878,403 | A | 3/1999 | DeFrancesco |
| 6,126,332 | A * | 10/2000 | Cubbage et al. ............. 710/2 |
| 6,182,048 | B1 | 1/2001 | Osborn et al. |
| 6,208,979 | B1 | 3/2001 | Sinclair |
| 6,236,977 | B1 | 5/2001 | Verba et al. |
| 6,587,841 | B1 | 7/2003 | DeFrancesco |
| 6,738,748 | B2 | 5/2004 | Wetzer |
| 6,772,145 | B2 | 8/2004 | Shishido |
| 6,898,574 | B1 | 5/2005 | Regan |
| 6,959,281 | B1 | 10/2005 | Freeling et al. |
| 7,050,982 | B2 | 5/2006 | Sheinson et al. |
| 7,092,898 | B1 | 8/2006 | Mattick et al. |
| 7,113,853 | B2 | 9/2006 | Hecklinger |

(Continued)

FOREIGN PATENT DOCUMENTS

| EP | 1 122 664 | 8/2001 |
| JP | 09-251486 | 9/1997 |

(Continued)

OTHER PUBLICATIONS

Autobytel.com, dated Aug. 6, 2004 as printed from The Wayback Machine at http://web.archive.org/web/20040806010507//http://autobytel.com/, in 3 pages.

(Continued)

*Primary Examiner* — Robert R Niquette
(74) *Attorney, Agent, or Firm* — Knobbe Martens Olson & Bear LLP

(57) ABSTRACT

Systems and methods for analyzing the risk associated with lenders offering vehicle loans is determined based on historical data associated with the vehicle. Vehicle registration data for a region is accessed to determine the vehicles registered in the region and the lien holders of the vehicles. Historical data of the vehicles is accessed and analyzed to determine if any events adversely affecting the value of the vehicles, such as vehicle title brands, are associated with the vehicles. The vehicle history data is associated with the lien holders of the vehicles. A risk value may be determined for each lien holder by comparing the lien holder's total number of liens to those liens on vehicles associated with history events adversely affecting the value of the vehicle.

20 Claims, 9 Drawing Sheets

(56) References Cited

U.S. PATENT DOCUMENTS

| | | |
|---|---|---|
| 7,181,427 B1 | 2/2007 | DeFrancesco |
| 7,184,974 B2 | 2/2007 | Shishido |
| 7,228,298 B1 | 6/2007 | Raines |
| 7,275,083 B1 | 9/2007 | Seibel et al. |
| 7,366,694 B2 | 4/2008 | Lazerson |
| 7,421,322 B1 | 9/2008 | Silversmith et al. |
| 7,472,088 B2 | 12/2008 | Taylor et al. |
| RE40,692 E | 3/2009 | Rose, Jr. |
| 7,505,838 B2 | 3/2009 | Raines et al. |
| 7,571,139 B1 | 8/2009 | Giordano et al. |
| 7,580,856 B1 | 8/2009 | Pliha |
| 7,590,589 B2 | 9/2009 | Hoffberg |
| 7,596,512 B1 | 9/2009 | Raines et al. |
| 7,610,257 B1 | 10/2009 | Abrahams |
| 7,653,592 B1 | 1/2010 | Flaxman |
| 7,693,896 B1 | 4/2010 | Raines |
| 7,778,841 B1 * | 8/2010 | Bayer et al. .................... 705/306 |
| 7,788,147 B2 | 8/2010 | Haggerty et al. |
| 7,962,404 B1 | 6/2011 | Metzger, II et al. |
| 8,005,759 B2 | 8/2011 | Hirtenstein et al. |
| 8,219,464 B2 | 7/2012 | Inghelbrecht et al. |
| 8,355,983 B1 | 1/2013 | Parr et al. |
| 8,392,334 B2 | 3/2013 | Hirtenstein et al. |
| 8,560,161 B1 | 10/2013 | Kator et al. |
| 8,595,079 B1 | 11/2013 | Raines et al. |
| 8,600,823 B1 | 12/2013 | Raines et al. |
| 8,626,560 B1 | 1/2014 | Anderson |
| 2002/0023051 A1 | 2/2002 | Kunzle et al. |
| 2002/0072964 A1 | 6/2002 | Choi |
| 2002/0091706 A1 * | 7/2002 | Anderson et al. .......... 707/104.1 |
| 2002/0099628 A1 | 7/2002 | Yakaoka et al. |
| 2002/0128960 A1 | 9/2002 | Lambiotte et al. |
| 2003/0033242 A1 | 2/2003 | Lynch et al. |
| 2003/0036996 A1 | 2/2003 | Lazerson |
| 2003/0041019 A1 | 2/2003 | Vagim, III et al. |
| 2003/0105279 A1 | 6/2003 | Yano et al. |
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0107125 A1 | 6/2004 | Guheen et al. |
| 2004/0163101 A1 | 8/2004 | Swix |
| 2005/0038580 A1 | 2/2005 | Seim et al. |
| 2005/0246256 A1 * | 11/2005 | Gastineau et al. .............. 705/35 |
| 2005/0251820 A1 | 11/2005 | Stefanik et al. |
| 2005/0256780 A1 | 11/2005 | Eldred |
| 2005/0267774 A1 | 12/2005 | Merritt et al. |
| 2006/0004731 A1 | 1/2006 | Seibel et al. |
| 2006/0041443 A1 | 2/2006 | Horvath |
| 2006/0178793 A1 * | 8/2006 | Hecklinger .................... 701/35 |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2007/0156515 A1 | 7/2007 | Hasselback et al. |
| 2007/0179798 A1 | 8/2007 | Inbarajan |
| 2007/0179860 A1 | 8/2007 | Romero |
| 2007/0192165 A1 | 8/2007 | Haggerty et al. |
| 2007/0226130 A1 | 9/2007 | Haggerty et al. |
| 2007/0226131 A1 * | 9/2007 | Decker et al. ................... 705/38 |
| 2007/0244732 A1 | 10/2007 | Chatterji et al. |
| 2007/0250327 A1 | 10/2007 | Hedy |
| 2007/0288271 A1 | 12/2007 | Klinkhammer |
| 2008/0015954 A1 * | 1/2008 | Huber et al. .................... 705/28 |
| 2008/0059317 A1 | 3/2008 | Chandran et al. |
| 2008/0120155 A1 | 5/2008 | Pliha |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0312969 A1 | 12/2008 | Raines et al. |
| 2009/0018996 A1 | 1/2009 | Hunt et al. |
| 2009/0271296 A1 | 10/2009 | Romero |
| 2010/0094664 A1 | 4/2010 | Bush et al. |
| 2010/0198629 A1 | 8/2010 | Weisleder et al. |
| 2010/0332292 A1 | 12/2010 | Anderson |
| 2011/0213641 A1 | 9/2011 | Metzger, II et al. |
| 2011/0320241 A1 | 12/2011 | Miller |
| 2012/0106801 A1 | 5/2012 | Jackson |
| 2012/0254017 A1 | 10/2012 | Fusco et al. |
| 2013/0173481 A1 | 7/2013 | Hirtenstein et al. |
| 2014/0082017 A1 | 3/2014 | Miller |

FOREIGN PATENT DOCUMENTS

| | | |
|---|---|---|
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-00365 94 | 7/2000 |
| KR | 10-2000-0036594 | 7/2000 |
| KR | 10-2000-00639 95 | 11/2000 |
| KR | 10-2000-0063995 | 11/2000 |
| KR | 10-2001-00163 49 | 3/2001 |
| KR | 10-2001-0016349 | 3/2001 |
| KR | 10-2001-00351 45 | 5/2001 |
| KR | 10-2001-0035145 | 5/2001 |
| KR | 10-2002-00071 32 | 1/2002 |
| KR | 10-2002-0007132 | 1/2002 |
| KR | 2002-0068866 | 8/2002 |
| WO | WO 99/04350 | 1/1999 |
| WO | WO 01/071458 | 9/2001 |
| WO | WO 01/71458 | 9/2001 |
| WO | WO 01/75754 | 10/2001 |
| WO | WO 03/101123 | 12/2003 |
| WO | WO 2007/149941 | 12/2007 |
| WO | WO 2008/022289 | 2/2008 |

OTHER PUBLICATIONS

Bankrate.com, dated Aug. 9, 2004 as printed from The Wayback Machine at http://web.archive.org/web/20040809000026/www.bankrate.com/brm/default.asp, in 3 pages.

Cars.com, dated Oct. 10, 2004 as printed from The Wayback Machine at http://web.archive.org/web/20041010081241/www.cars.com/go/index.jsp?aff=national, in 2 pages.

Carsdirect.com, dated Jul. 30, 2004 as printed from The Wayback Machine at http://web.archive.org/web/20040730142836/www.carsdirect.com/home, in 2 pages.

Checkbook.org, dated Jun. 4, 2004 as printed from The Wayback Machine at http://web.archive.org/web/20040604192834/www.checkbook.org/auto/carbarg.cfm, in 1 page.

Invoicedealers.com, dated Aug. 4, 2004 as printed from The Wayback Machine at http://web.archive.org/web/20040804044511/http://www.invoicedealers.com/, in 2 pages.

Ivillage.com; Aug. 5, 2004.

Watts, Craig, "Consumers Now Can Know What Loan Rate Offers to Expect Based on Their FICO Credit Score at MyFICO.com", Mar. 6, 2002, (http://www.myfico.com/PressRoom/PressReleases/2002_03_06.aspx).

"AutoConnect Partners with Organic to Build World's Most Comprehensive Online Emporium of Pre-Owned Vehicles", PR Newswire, May 19, 1998, pp. 2.

"Carfax Teams with Esurance", PR Newswire, May 14, 2001, 1 page.

"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.

Cohen et al., "Optimizer: IBM's Multi Echelon Inventory System for Managing Service Logistics", Interfaces, vol. 20, pp. 65-82, Jan.-Feb. 1990.

"Driveitaway.com Links with AutoCheck to Provide Car Shoppers Vehicle Histories", PR Newswire, Jan. 15, 2001, 1 Page.

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

(56) References Cited

OTHER PUBLICATIONS

Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.

Inderfurth et al., "Decision Support for Spare Parts Acquisition in Post Product Life Cycle", Central European Journal of Operations Research, vol. 16, pp. 17-42, 2008 [Initially published online Dec. 21, 2007].

"Japan's JAAI system appraises used cars over internet", Asia Pulse, Mar. 3, 2000.

Käki, Anssi, "Forecasting in End-Of-Life Spare Parts Procurement", Master's Thesis—Helsinki University of Technology System Analysis Laboratory, Jul. 27, 2007.

Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].

Koller, Mike, "Wireless Service Aids," InternetWeek; Jul. 9, 2001, p. 15.

Krupp, James A.G.; "Forecasting for the Automotive Aftermarket"; The Journal of Business Forecasting Methods & Systems; Winter 1993-1994; 12, 4; ABI/Inform Global; pp. 8-12.

Lapide, Larry, "New Developments in Business Forecasting", The Journal of Business Forecasting, pp. 12-14, Spring 2002.

Lee, Ho Geun, "AUCNET: Electronic Intermediary for Used-Car Transactions", EM-Electronic Markets, Dec. 1997, vol. 7, No. 4, pp. 24-28.

Miller, Joe, "NADA used-car prices go online", Automotive News, Jun. 14, 1999, p. 36.

Moore, John R., Jr. "Forecasting and Scheduling for Past-Model Replacement Parts" Management Science, Application Series, vol. 18, No. 4, Part 1, Dec. 1971, pp. B200-B213.

Packer, A. H., "Simulation and Adaptive Forecasting an Applied to Inventory Control", Operations Research, vol. 15, No. 4, pp. 660-679, Jul. 1965.

Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.

Porter, G. Zell, "An Economic Method for Evaluating Electronic Component Obsolescence Solutions", Retrieved from the web at www.gidep.org/data/dmsms/library/zell.pdf, May. 1998, pp. 1-9.

Roos, Gina, "Web-Based Service Helps OEMs Cure Parts Obsolescence Blues", Electronic Engineering Times, p. 86, Oct. 8, 2001, Dialog 09056737 78968668.

Santarini, Michael, "Forecasts the Probably Obsolescence of Components—Module Predicts Parts Life", Electronic Engineering Times, Jan. 11, 1999, p. 48(1), Dialog 0607160353548246.

Sawyers, Arlena, "NADA to Offer Residual Guide", Automotive News, May 22, 2000, p. 3.

"Stoneage Corporation Announces Database of 250,000 Used Cars Posted to the Internet", PR Newswire, Feb. 24, 1998, 1 Page.

Sullivan, Laurie, "Obsolete-Parts Program Thriving", EBN, Manhasset, Issue 1296, p. 26, Jan. 2002, ProQuest 10 101195090.

"WashingtonPost.com and Cars.com launch comprehensive automotive web site for the Washington area", PR Newswire, Oct. 22, 1998.

Webster, Lee R., "Failure Rates & Life Cycle Costs", Consulting-Specifying Engineer; 23, 4; ABI/INFORM Global, Apr. 1998, p. 42.

"Web Sites Let Automotive Consumers Arm Themselves with Price Information", Orange County Register, Nov. 14, 1997, pp. 3.

"Yahoo! Autos Provides Enhanced Road Map for Researching, Buying and Selling Cars Online", PR Newswire, Oct. 13, 1998, pp. 2.

"Appraisal Tool", VAuto Live Market View; http://www.vauto.com/vAuto_solution/appraisal.asp, 3 pages.

"Intelligence Insight Impact", Polk Automotive Manufacturers; http://usa.polk.com/Industries/AutoMfr/Analyze/MarketAnalysis/, 3 pages.

"NAAA-Recommended Vehicle Condition Grading Scale", 3 pages.

"Power to Drive your Business", J.D. Power and Associates Power Information Network; http://www.powerinfonet.com/products/productDetail.asp?type=financialinstitutions, 2 pages.

"Pricing Tool", VAuto Live Market View; http://www.avauto.com/vAuto_Solution/pricing.asp, 2pages.

"Urban Science Launches Second Generation Lead Scoring Solution", Urban Science; Mar. 1, 2007, http://www.urbanscience.com/newsevents/pr_20070222.html, 3 pages.

Autobytel.com, dated Aug. 6, 2004 as printed from The Wayback Machine at http://archive.org/web/20040806010507//http://autobytel.com, in 3 pages.

* cited by examiner

RISK ANALYSIS
COMPUTER SYSTEM

Market Review: Lender Summary
Period: MM/YYYY
Geography: Texas
Dealer Type: Franchise and Independent Market Totals
Total Vehicles: ###
Number of Vehicles with Adverse Events ###
% of Vehicles with Adverse Events %

Lender Focus Named Lender
Number of Transactions ###
Number of Vehicles with Adverse Events ###
% of Vehicles with Adverse Events %
% of Adverse Event Market %

FIG. 7

Market Review: Lender Activity
Period: MM/YYYY
Geography: Texas

Lender Focus: named lender
Total Lender Transactions ###
Total Lender Adverse Events ###
% of Lender Adverse Events %

| Dealer | Total Transactions Financed at Dealer | Total Adverse Event Count | % of Dealer Records with Adverse Events | Total Lender Financed Count | Lenders % of Dealer Financing | Adverse Events Financed by Lender | % of Lenders Transactions with Adverse Events | % of Lender Exposure to Adverse Events |
|---|---|---|---|---|---|---|---|---|
| AIRPORT SUZUKI | 34 | 5 | 15% | 17 | 50% | 3 | 17.6% | 60.0% |
| ARROW FORD INC | 162 | 11 | 7% | 45 | 28% | 2 | 4.4% | 18.2% |
| AUTO MERCHANTS INC (DALLAS) | 34 | 2 | 6% | 4 | 12% | 2 | 50.0% | 100.0% |
| BAYWAY KIA | 134 | 8 | 6% | 56 | 42% | 2 | 3.6% | 25.0% |
| CLAY COOLEY MOTOR COMPAN (DALLAS) | 112 | 6 | 5% | 42 | 38% | 3 | 7.1% | 50.0% |
| CONCOURSE MOTORS | 15 | 1 | 7% | 2 | 13% | 1 | 50.0% | 100.0% |
| EXPO SUZUKI INC | 32 | 1 | 3% | 11 | 34% | 1 | 9.1% | 100.0% |
| FRANKLIN FORD | 43 | 2 | 5% | 24 | 56% | 0 | 0.0% | 0.0% |
| FREEDOM CHEVROLET (DALLAS) | 87 | 5 | 6% | 60 | 69% | 2 | 3.3% | 40.0% |
| GILLMAN CHEVROLET (SAN BENITO) | 55 | 1 | 2% | 32 | 58% | 1 | 3.1% | 100.0% |
| GILLMAN IMPORTS INC | 55 | 2 | 4% | 12 | 22% | 1 | 8.3% | 50.0% |
| GRAPEVINE SUZUKI | 40 | 5 | 13% | 15 | 38% | 2 | 13.3% | 40.0% |
| LONE STAR PONT BUICK GMC | 39 | 3 | 8% | 0 | 51% | 1 | 5.0% | 33.3% |

FIG. 8

United States Patent US 9,147,217 B1

SYSTEMS AND METHODS FOR ANALYZING LENDER RISK USING VEHICLE HISTORICAL DATA

BACKGROUND

1. Field of the Disclosure

This disclosure relates to systems and methods for analyzing risk associated with lenders offering loans for automobiles.

2. Background of the Disclosure

Most consumers wishing to purchase a new vehicle, such as an automobile, do not have adequate cash to purchase the vehicle. As a result, consumers often need to finance their vehicles by taking out a loan. Some consumers borrow directly from a bank, while other consumers may borrow from the entity selling the vehicle, such as a car dealership. Car dealerships may not only offer loans as a service to their customers, but also as an additional means to generate profit from the sale of vehicles by charging interest on the loan. Some car dealerships, however, may not have adequate cash to provide funding for all of their customers. As a result, some car dealerships borrow money from a bank or financial institution in order to finance loans to customers to buy vehicles. In such scenarios, the bank or financial institution may be considered a direct lender, while the car dealership may be considered an indirect lender.

When vehicles are purchased with financing, the purchased vehicle acts as part of the collateral for the loan. As such, the value of the vehicle is linked to the risk associated with lending money for the purchase of the vehicle. Direct and indirect lenders of funds might mitigate some of this risk by adjusting the interest rate offered on the vehicle loan. For example, the interest rate on a new vehicle may be lower than that of a pre-owned vehicle, or the interest rate on a loan for a luxury brand of car may be lower than the interest rate for a loan on a non-luxury brand of car, because the luxury brand may retain its value better. Indirect lenders may manage this risk on a sale-by-sale basis since they may adjust the interest rates for each sale individually. A direct lender, however can only manage the risk associated with the dealings involving the indirect lender, not the risk associated with the individual sale. Accordingly, direct lenders may evaluate the business practices of the indirect lender in order to assess risk. For example, the direct lender might charge a car dealer only selling new cars less interest than a car dealer only selling pre-owned cars. Alternatively, a direct lender might charge less interest to a car dealer specializing in luxury brands than a car dealer specializing in non-luxury brands.

While most new cars of the same make, model, and sub-model carry approximately the same value, the value of pre-owned cars can vary greatly within the same class. For example, wear, mileage, geography and maintenance history may all affect the value of a pre-owned car in addition to the make, model and sub-model of the vehicle. Furthermore, pre-owned cars may have been subject to events that significantly impact the value of the car in a negative way. In some jurisdictions, these events result in a "brand" being placed on the title of the vehicle. A brand is a permanent designation on the title of the vehicle indicating that an event occurred to the vehicle that may negatively impact the value of the vehicle. For example, if a vehicle received flood damage, it may be branded, or, if a vehicle was involved in an accident and declared a total loss (i.e., the cost to repair the vehicle exceeds the value of the vehicle), the title of the vehicle may receive a brand. Vehicle title branding exists, in part, to notify later purchasers of the vehicle of an event negatively impacting the value of the vehicle because in many cases, repair may make the event less noticeable or undetectable.

Direct lenders often rely upon the indirect lenders to which they lend money to ensure the vehicles they finance are free from title brands, defects or other adverse historical events that would significantly, and negatively, impact the value of the vehicles. While direct lenders may be able to analyze the business practices of the indirect lenders in their portfolio at a macro level, it may be difficult to ensure that the indirect lenders are following the best practices of their industry, or the best practices of their business model. For example, while an indirect lender may represent to a direct lender that they will only finance pre-owned cars free of title brands, the direct lender has no way of verifying that the indirect lender is not providing loans for vehicles with title brands or adverse history events. Thus, direct lenders are limited in their means for assessing the risk of their indirect lenders.

SUMMARY OF THE DISCLOSURE

The present disclosure provides a system and method for direct lenders to assess the risk associated with the indirect lenders in their loan portfolio given the market data and the histories of vehicles in that market. For example, a method is disclosed whereby vehicle registration data is accessed. The vehicle registration data may include a vehicle identification number (VIN) and lien information. The lien information of the vehicle registration data may be analyzed to determine lien holders, and/or indirect lenders, for vehicles associated with the corresponding VIN. The VIN may be used to determine vehicle history data for the vehicle associated with the VIN. The vehicle history data may be analyzed to determine if any adverse history events have occurred with respect to the vehicle. Then, a risk level may be determined for the indirect lenders based on whether there were adverse history events associated with the VINs for which the indirect lender gave loans.

The present disclosure also discloses a system for assessing risk comprising one or more computer processors configured to execute software instructions and a computer readable medium storing software instructions that cause the processor to access vehicle registration data. The vehicle registration data may include a vehicle identification number (VIN) and lien information. The lien information of the vehicle registration data may be analyzed to determine lien holders, and/or indirect lenders, for vehicles associated with the corresponding VIN. The VIN may be used to determine vehicle history data for the vehicle associated with the VIN. The vehicle history data may be analyzed to determine if any adverse history events occurred with respect to the vehicle. Then, a risk level may be determined for the indirect lenders based on whether there were adverse history events associated with the VINs, for which the indirect lender gave loans.

BRIEF DESCRIPTION OF THE DRAWINGS

FIGS. 5-9 are embodiments of example output reports of the risk analysis computer system

DETAILED DESCRIPTION OF THE PREFERRED EMBODIMENT

Embodiments of the disclosure will now be described with reference to the accompanying figures, wherein like numerals generally refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Figure 1:
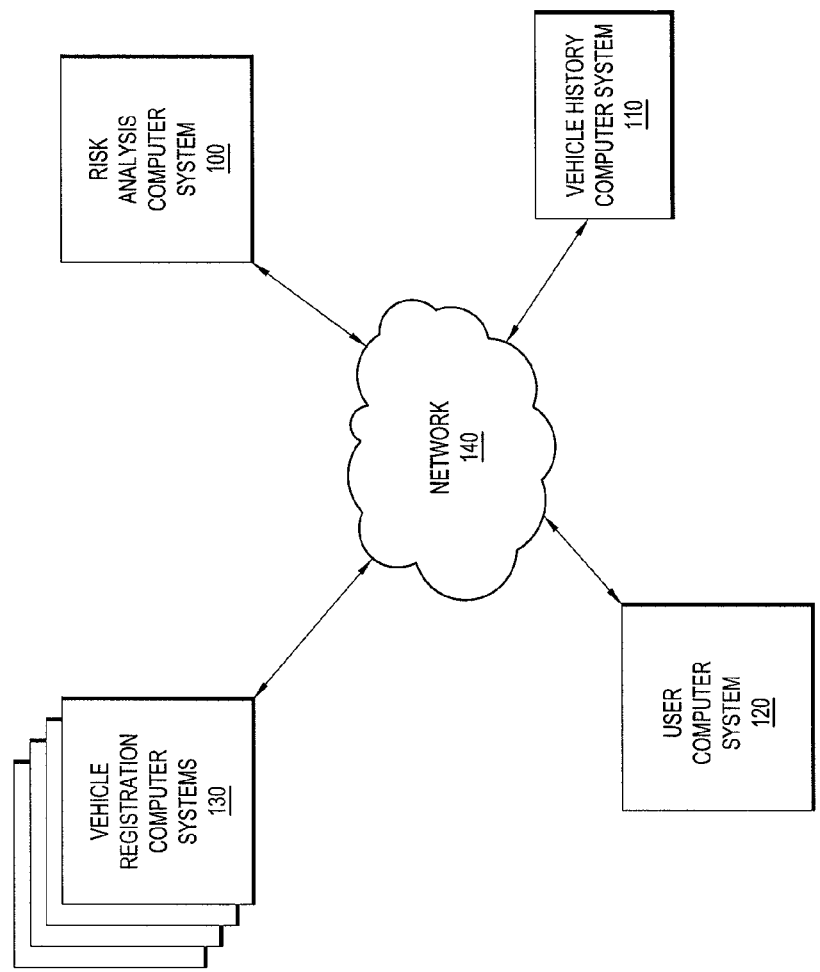
FIG. 1 is a block diagram illustrating one embodiment of a risk analysis computer system in communication with one or more vehicle registration systems, a vehicle history computer system and a user computer system.

FIG. 1 is a block diagram illustrating one embodiment of a risk analysis computer system 100 in communication with one or more vehicle registration computer systems 130, a vehicle history computer system 110 and a user computer system 120. In one embodiment, the risk analysis computer system 100 communicates through the network 140 with one or more the vehicle registration computer systems 130. Vehicle registration computer systems 130 may include, for example, computer systems of the Department of Motor Vehicles ("DMV") for one or more states or counties. In one embodiment, the vehicle registration computer systems 130 may store and process registration data of the automobiles, or other transportation vehicles, within a particular region. For example, the vehicle registration computer systems 130 may store and process registration data for all vehicles registered within one state. In another embodiment, the vehicle registration computer systems 130 may store and process registration data for a particular county, or group of counties, within a state. The vehicle registration data may include, for example, vehicle owner information, unique vehicle identification information (for example, a Vehicle Identification Number or "VIN"), and attributes of the vehicle such as the make, model, year, weight, and the like. In some embodiments, the vehicle registration data may also include lien information if the vehicle was purchased with a loan. The lien information may include, for example, data identifying the lien holder. The lien holder, may be a lender of only automotive loans, or in other embodiments, may be a lender that offers automotive loans in addition to other loans. In some embodiments, the lien holder may the entity, such as a car dealership, that sold the vehicle to the person or entity identified as the owner of the vehicle in the registration data.

In one embodiment, the risk analysis computer system 100 may be in communication with the vehicle history computer system 110. The vehicle history computer system 110 may, in some embodiments, act as a data warehouse for vehicle history data. The vehicle history data may be collected from one or more computer systems managing vehicle maintenance data (not shown). In some embodiments, the vehicle history computer system 110 may also collect vehicle history data from automobile insurance computer systems (not shown). In some embodiments, the vehicle history data may be collected from one or more computer systems managing law enforcement data (not shown). In some embodiments, vehicle history data may include a VIN and history events associated with the VIN. The history events may be, for example, maintenance events, such as when the vehicle identified by the VIN received an oil change or when parts of the vehicle identified by the VIN were replaced. In some embodiments, the history events may negatively affect the value of the vehicle. For example, the history events may be a vehicle title brand. A vehicle title brand is a permanent designation on a vehicle's title that indicates the vehicle may have been severely damaged. For example, a vehicle title brand may indicate that the vehicle is a salvage vehicle (for example, the vehicle may be repaired by only at a cost that is more than the value of the vehicle), the vehicle was rebuilt from a salvage vehicle, or the vehicle is irreparable. In other embodiments, the history events may include other information that could negatively affect the value of the vehicle in addition to a title brand, such as, for example, an indication that the vehicle was repeatedly repaired for the same issue under a new car warranty (i.e., a "lemon" vehicle), stolen, abandoned or used as a commercial and/or public works fleet vehicle (for example, taxi or police vehicle).

While in some embodiments, the risk analysis computer system 100 may be separate and independent of the vehicle history computer system 110 and communicate over the network 140, it other embodiments the risk analysis computer system 100 and the vehicle history computer system 110 may be part of the same computer system and communicate directly through a bus, Input/Output port, or other direct means of communication known in the art.

In one embodiment, the risk analysis computer system 100 may be in communication with the user computer system 120. The risk analysis computer system 100 may, for example host a website where the user computer system 120 may request reports containing risk analysis information. In one embodiment, a financial institution that provides loans to automotive lenders may operate the user computer system 120. The financial institution may operate the user computer system 120 in order to request reports detailing the activities of the automotive lenders to which the financial institution has provided loans. For example, the financial institution may be a bank and the automotive lenders may include one or more independently owned pre-owned automotive sellers, or one or more franchise automotive sellers selling pre-owned and new automobiles. In other embodiments, sales and marketing teams may operate the user computer system 120. Sales and marketing teams, for example, may access the risk analysis computer system 100 as a means of generating a market overview report.

In one embodiment, the system outlined in FIG. 1 is computerized, wherein each of the illustrated components comprises a computing device that is configured to communicate with other computing devices via the network 140. For example, the user computer system 120 may comprise a computing device, such as a desktop, notebook, or handheld computing device that is configured to transmit and receive data to/from other computing devices via the network 140. Similarly, each of the vehicle registration computer systems 130, the risk analysis computer system 100, and the vehicle history computer system 110, may include one or more computing devices that are configured to communicate data with other computing devices via the network 140. In various embodiments, the network 140 may comprise one or more of any type of network, such as one or more local area networks, wide area networks, personal area networks, telephone network, and/or the Internet, which may be accessed via any available wired and/or wireless communication protocols. Thus, the network 140 may comprise a secure LAN through which the risk analysis computer system 100 and the vehicle history computer system 110 communicate, and the network 140 may further comprise an Internet connection through which the risk analysis computer system 100 and the vehicle history computer system 110 communicate. Any other combination of networks, including secured and unsecured network communication links, are contemplated for use in the systems described herein.

Figure 2:
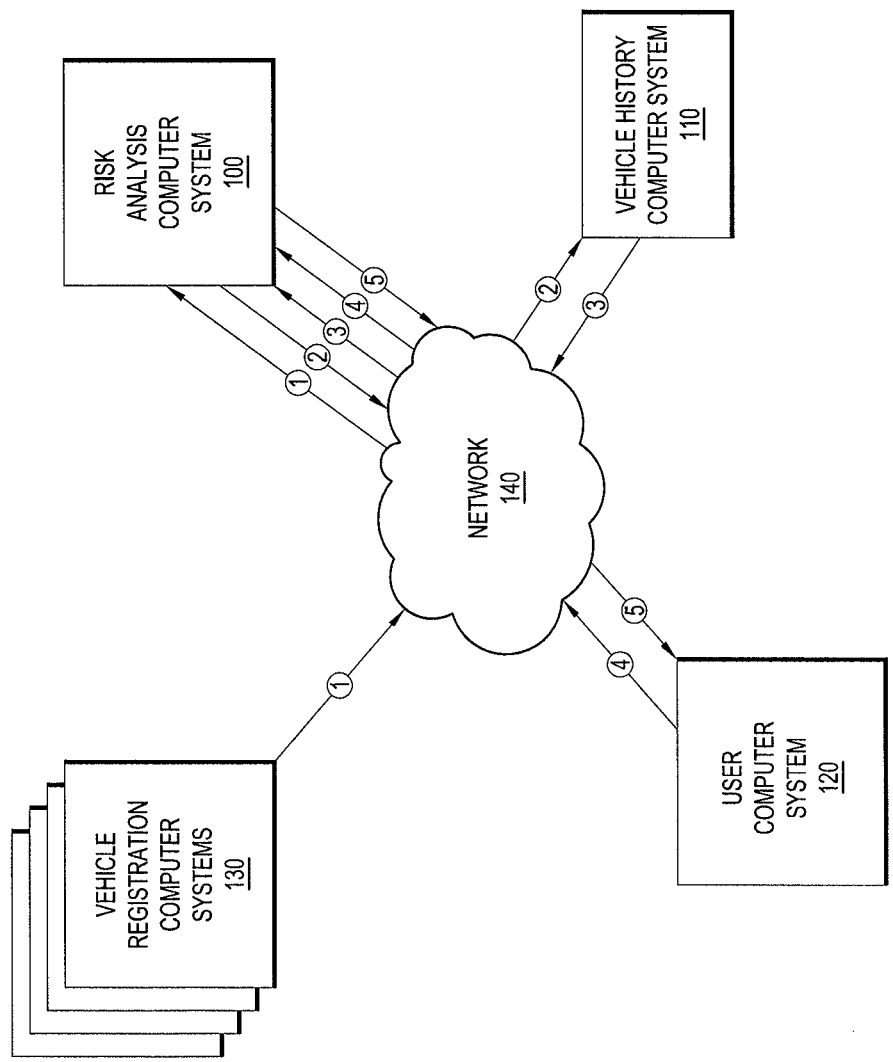
FIG. 2 is a block diagram illustrating another embodiment of a risk analysis computer system in communication with one or more vehicle registration systems, a vehicle history computer system and a user computer system, where an example temporal flow of data is outlined.

FIG. 2 is a block diagram illustrating another embodiment of the risk analysis computer system 100 in communication with one or more vehicle registration systems 130, the vehicle history computer system 110 and the user computer system 120 where an example flow of data is outlined. In particular, the circled numerals of FIG. 2 illustrate one example of the time order in which data flows between the various components of FIG. 2 according to one embodiment. In another embodiment, the steps outlined by the circled numerals may be performed in a different order, and the method may include fewer or additional steps.

In step 1 of FIG. 2, the risk analysis computer system 100 may access vehicle registration data from the vehicle registration computer systems 130. In one embodiment, the vehicle registration data may include owner data, lien data and vehicle data as indicated above. In some embodiments, the risk analysis computer system 100 may make a request of the vehicle registration computer systems 130 via the network 140 for the most recent vehicle registration data stored in the vehicle registration computer systems 130. In some embodiments, the request may be sent to an intermediate database on a computer system (not shown in FIG. 2) which has previously received, processed and stored vehicle registration data from the vehicle registration computer systems 130. The request may, for example, be the output of a script or program executed on a periodic basis by the risk analysis computer system 100. In other embodiments, the risk analysis computer system 100 may make the request for vehicle registration data through a third-party computer system such as web service or some other intermediary. In some embodiments, the request may be made on a periodic basis, such as, for example, every day, every week, every month, etc. In other embodiments, the request may be made as a result of an input from a user or other computer system to the risk analysis computer system 100 to access up-to-date vehicle registration data.

The vehicle registration computer systems 130 may respond to the request by sending vehicle registration data to the risk analysis computer system 100. The data may be formatted such that the risk analysis computer system 100 may effectively process it. For example, in one embodiment, the data may be transferred in a formatted file, such as, for example, an XML file. In another embodiment, the data may be transferred as a serialized object. In other embodiments, the vehicle registration computer systems 130 may provide an API for the risk analysis computer system 100 to make specific requests for data, element by element. The method of transfer of data between the vehicle registration computer systems 130 and the risk analysis computer system 100 may be via any means known in the art to transfer data between computer systems across a network such as the network 140.

In step 2 illustrated in FIG. 2, the risk analysis computer system 100 may make data requests to vehicle history computer systems 130 for vehicle history data. The vehicle history data may include historical events that adversely affect the value of a vehicle as indicated above. The request may, for example, be the output of a script or program executed on a periodic basis by the risk analysis computer system 100. In other embodiments, the request may be made as a result of an input from a user or other computer system to the risk analysis computer system 100 to access up-to-date vehicle registration data. In other embodiments, the risk analysis computer system 100 may make requests for up-to-date vehicle history data from the vehicle history computer system 110 as it receives vehicle registration data from vehicle registration computer systems. For example, the risk analysis computer system 100 may receive vehicle registration data for a particular VIN from the vehicle registration computer systems 130. Once the registration data is received, risk analysis computer system may then make a request for vehicle history data from the vehicle history computer system 110. The request may be made immediately upon receipt of the vehicle registration data so that the vehicle history data request is done in real-time, or near real-time. Thus, vehicle registration data and vehicle history data may remain current and synchronized. In other embodiments, efficiency may dictate that the risk analysis computer system 100 make data requests of the vehicle history computer system 110 on a periodic basis. For example, risk analysis computer system may provide a list of VIN's received by the vehicle registration computer systems 130 to the vehicle history computer system 110 and request vehicle history data for each VIN in the list.

In step 3 of FIG. 2, the vehicle history computer system 110 sends vehicle history data to the risk analysis computer system 100 matching the request made in step 2. The vehicle history data may be formatted such that the risk analysis computer system 100 may effectively process the data. For example, in one embodiment, the data may be transferred in a formatted file, such as for example, an XML file. In another embodiment, the data may be transferred as a serialized object. In other embodiments, the vehicle history computer system 110 may provide an API for the risk analysis computer system 100 to make specific requests for data, element by element. The method of transfer of data between the vehicle history computer system 110 and the risk analysis computer system 100 may be by any means known in the art to transfer data between computer systems across a network such as the network 140.

As noted above, in some embodiments, the risk analysis computer system 100 and the vehicle history computer system 110 may be part of the same computer system, and communicate via a communications bus or other form of direct communication known in the art, as opposed to the network 140.

In step 4, the user computer system 120 may request a report from the risk analysis computer system 100. The request may be made over the network 140. In one embodiment, the risk analysis computer system 100 may generate a user interface to send to the user computer system 120. Once received, a user of the user computer system 120 may use the user interface to request a report. For example, the user interface may allow for the entry of parameters used by the risk analysis computer system 100 to generate the report. The user interface may comprise one or more user interface elements. For example, one user interface element may be a drop down list allowing the user to indicate what type of report the user desires, or may be one or more date selection user interface elements allowing for the entry of a time period for the report. In some embodiments, the user interface may allow for the entry of a particular lender of automotive loans that will be the subject of the risk analysis report generated by the risk analysis computer system 100. The user interface may also permit the entry of additional parameters for generating the report such as, for example, geography. In addition, in one embodiment, the user interface may include a drop-down list allowing for entry of a lender, or dealer, type. For example, such a drop-down list may allow for the selection of one or more type from: franchise dealer, independent dealer, franchise and independent dealer, new dealer, pre-owned dealer, new and pre-owned dealer, etc. In addition, in one embodiment, the user interface may also include a drop-down list allowing for entry of vehicle details such as Make, Model, Year, Vehicle Type, etc. In one embodiment, the user interface may include an action button that when selected, transmits the parameters entered into the user interface to the risk analysis computer system 100. In some embodiments, the user interface may allow the user computer system 120 to select email as a method of report delivery and may provide for entry of an email address. The user interface may, in some embodiments, be a web page comprising one or more web page elements allowing for data entry. In other embodiments, the user interface may be part of a client application running on the user computer system 120 and in communication with the risk analysis computer system 100 through the network 140.

In step 5, the risk analysis computer system 100 generates a report based on the parameters sent by the user computer system 120 in step 4. In one embodiment, the report may be generated based on data collected from the vehicle registration computer systems 130 and the vehicle history computer system 110, and may also include risk analysis data derived from the collected data. Once the report is generated, it may be transmitted to the user computer system 120 via the network 140. In one embodiment, the report may be formatted as a user interface configured for display on the user computer system 120. For example, the report may be a HTML document. In another embodiment, the report may be generated in Portable Document Format ("PDF") or plain text. In another embodiment, the report may be generate using widely known and used spreadsheet software such as Microsoft Excel™ or Lotus 1-2-3™. In some embodiments, the user computer system 120 may execute an application configured to display report information generated by the risk analysis computer system 100. In such embodiments, the report may be generated as a data stream, XML file, serialized object, or any other format suitable for transmitting data between computer systems over the network 140. In some embodiments, the user computer system 120 may request that the report be sent to the user computer system 120 as an email. The risk analysis computer system 100 may then generate the report in a format suitable for display in an email client application, such as plain text or HTML. Once generated, the risk analysis computer system 100 may send the email to an email address specified by the user computer system 120.

Figure 3:
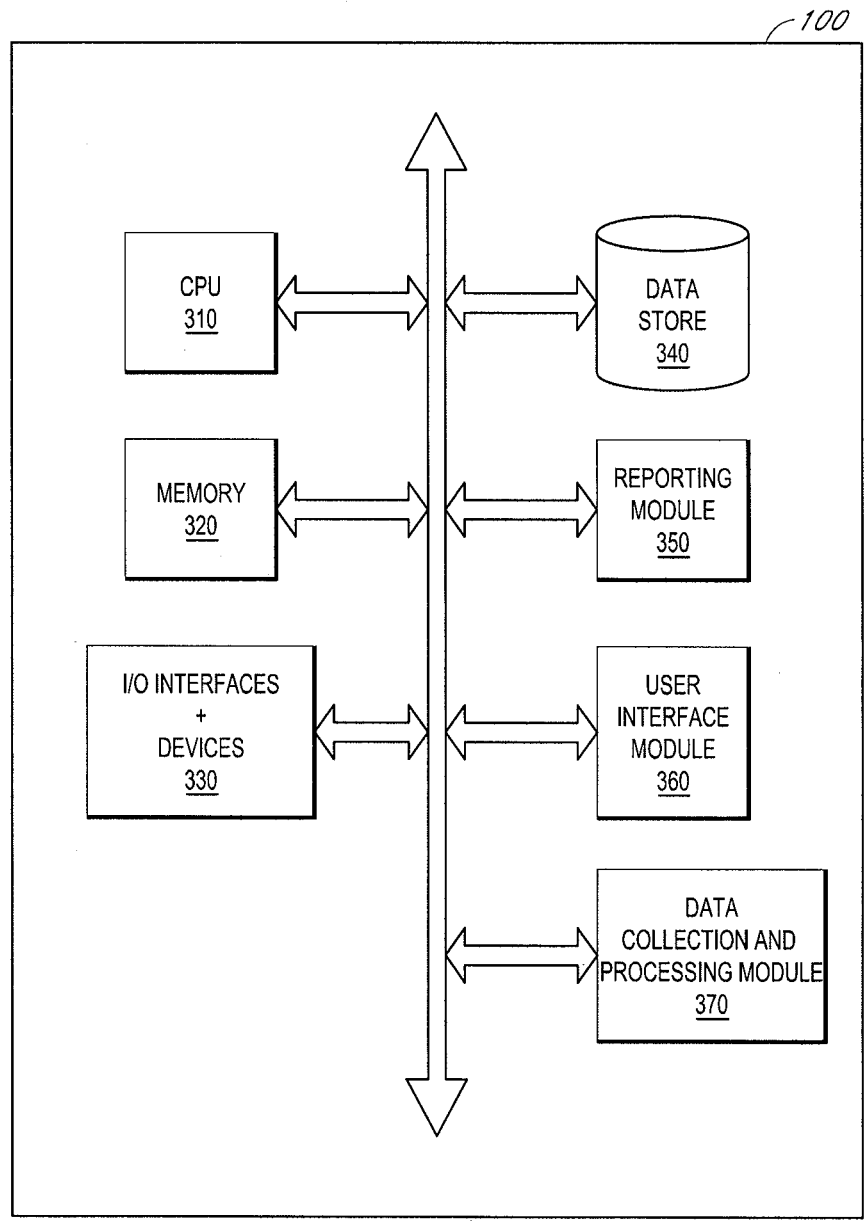
FIG. 3 is a block diagram illustrating one embodiment of a risk analysis computer system.

FIG. 3 is a block diagram illustrating one embodiment of the risk analysis computer system 100. In one embodiment, the risk analysis computer system 100 is configured to interface with multiple devices and/or data sources, such as in the example environments of FIG. 1 and FIG. 2. The risk analysis computer system 100 may be used to implement certain systems and methods described herein. For example, in one embodiment the risk analysis computer system 100 may be configured to access vehicle registration data from the vehicle registration computer systems 130, access vehicle history data from the vehicle history computer system 110, analyze the data accessed from the vehicle registration computer systems 130 and the vehicle history computer system 110, and generate and transmit reports to the user computer system 120. In various embodiments, the functionality provided in the components and modules of the risk analysis computer system 100 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules may be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more CPUs in order to cause the computing system 140 to perform particular operations.

It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the risk analysis computer system 100 includes, for example, a server or a personal computer that is IBM, Macintosh, or Linux/Unix compatible. In another embodiment, the risk analysis computer system 100 comprises a laptop computer, smart phone, personal digital assistant, or other computing device, for example. In one embodiment, the example the risk analysis computer system 100 includes one or more central processing units ("CPU") 310, which may include one or more conventional or proprietary microprocessors. The risk analysis computer system 100 further includes a memory 320, such as random access memory ("RAM") for temporary storage of information and a read only memory ("ROM") for permanent storage of information, and a the data store 340, such as a hard drive, diskette, or optical media storage device. In certain embodiments, the data store 340 stores vehicle registration data, vehicle history data, and/or lender data. Embodiments of the data store 340 may store data in databases, flat files, spreadsheets, or any other data structure known in the art. Typically, the modules of the risk analysis computer system 100 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, the risk analysis computer system 100 leverages computing and storage services available over the Internet (cloud computing).

The risk analysis computer system 100 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, the risk analysis computer system 100 may be controlled by a proprietary operating system. Conventional operating systems control and schedule computer processes for execution, perform memory management, provide file system, networking, and I/O services, and provide a user interface, such as a graphical user interface ("GUI"), among other things.

The example the risk analysis computer system 100 may include one or more commonly available input/output (I/O) interfaces and devices 330, such as a keyboard, mouse, touchpad, and printer. In one embodiment, the I/O devices and interfaces 330 include one or more display device, such as a monitor, that allows the visual presentation of data to a user. More particularly, a display device provides for the presentation of GUIs, application software data, and multimedia presentations, for example. In one embodiment, I/O interfaces and devices 330 comprise devices that are in communication with modules of the risk analysis computer system 100 via a network, such as the network 140 and/or any secured local area network, for example. In the embodiment of FIG. 3, the I/O devices and interfaces 330 provide a communication interface to various external devices. For example, in this embodiment the risk analysis computer system 100 is in communication with a network, such as any combination of one or more LANs, WANs, or the Internet, for example, via a wired, wireless, or combination of wired and wireless, connections via a network interface of the I/O devices and interfaces 330.

In the embodiment of FIG. 3, the risk analysis computer system 100 also includes several application modules that may be executed by CPU 310. More particularly, the application modules include the user interface module 360 and the reporting module 350.

In one embodiment, the user interface module 360 may comprise software code executable by CPU 310 that handles the generation of user interfaces for accepting reporting requests from computer systems such as the user computer system 120. The user interface module 360 may also access data from the data store 340 in order to generate user interfaces. In one embodiment, the generated user interfaces may be transmitted via the network 140 using I/O interfaces and devices 330.

The reporting module 350, in one embodiment, may comprise software code executable by CPU 310 that handles the generation of reports that may be accessed by the user computer system 120. The reporting module 350 may generate reports based on parameters input into user interfaces generated by the user interface module 360 and data stored in the data store 340. The reports may be generated in any format described above and may, in some embodiments, be sent to the user computer system 120 via the network 140. In one embodiment, several types of reports may be generated. For example, one type of report may be a market analysis report. In a market analysis report, the report may reflect data indicative of the overall market. Another type of report may be a lender report, where the report may reflect data indicative of a particular lender. In addition, a report may be generated that summarizes all lenders to which a bank or financial institution may have lent money for vehicle loans so that the bank of financial institution can view the performance of all of the lenders in their portfolio in one report.

In one embodiment, the data collection and processing module 370 may comprise software code executable by CPU 310 that handles accessing data stored on other computer systems. For example, the data collection and processing module 370 may comprise code for accessing vehicle registration data stored on the vehicle registration computer systems 130 or vehicle history data stored on the vehicle history computer system 110. Data collection and processing module may also communicate with the data store 340 in order to store data collected from various computer systems. In some embodiments, the data collection and processing module 370 may determine derived data and store the data in the data store 340. For example, data collection and processing module may determine a risk level associated with a lender and store the risk level in the data store 340. The risk level, in some embodiments, may be the percentage of loans underwritten by the lender on vehicles with adverse history events. In other embodiments, the risk level may be a quantitative value such as a risk score. In other embodiments, the risk level may be a string of characters indicating a risk level such as, for example, "high," "medium" or "low." The data collection and processing module 370 may also communicate with the reporting module 350 in order to generate reports.

Figure 4:
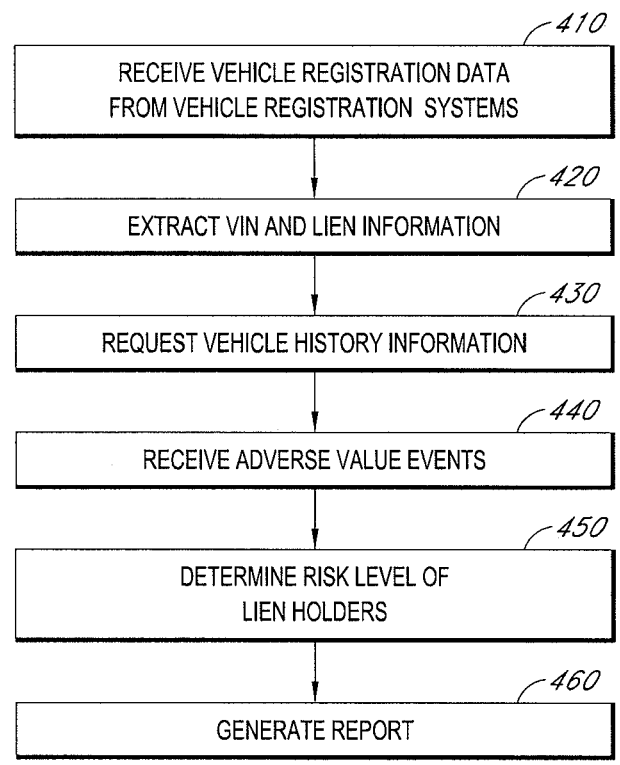
FIG. 4 is a flowchart illustrating the temporal flow of data for analyzing the risk associated with lenders of automobile loans and generating a report containing the analysis.

FIG. 4 is a flowchart illustrating a flow of data for analyzing the risk associated with lenders of automobile loans and generating a report containing the analysis. In one embodiment, the method of FIG. 4 is performed by the risk analysis computer system 100. The method, however, may be performed by any other suitable computing device. In various embodiments, the method may include fewer or additional blocks and/or the blocks may be performed in a different order than illustrated.

Beginning in block 410, the risk analysis computer system 100 receives vehicle registration data from the vehicle registration computer systems 130. The vehicle registration computer systems 130 may be, for example, computer systems operated by a state or county DMV. The data may be accessed on a periodic basis, such as every day, week, month, quarter, or other time period. In one embodiment, the vehicle registration data may comprise one or more vehicle data records. Each vehicle data record may correspond to a vehicle registered in the region for which the vehicle registration computer systems 130 maintains records. For example, if one of the vehicle registration computer systems 130 maintains records for Orange County, Calif., then the vehicle registration data accessed would include a vehicle data record for each vehicle registered for use in Orange County, Calif. The vehicle data record may include information pertaining to each registered vehicle such as, for example, VIN, make, model, year, odometer miles at the time of registration, registrant name, registrant address, lien holder name, lien holder address, lien term, etc. Once the vehicle data records are received by the risk analysis computer system 100, they may be stored in the data store 340. In some embodiments, the risk analysis computer system 100 may store the entire vehicle data record. In other embodiments, the risk analysis computer system 100 may extract a portion of the data record for storage in the data store 340.

Next, in block 420, the VIN and the lien information is extracted from the vehicle data records stored in the data store 340 or in other embodiments, memory 320. As noted above, the VIN represents a unique identifier of the registered vehicle. The lien information may include the name and address of the lien holder. Generally, each vehicle data record corresponds to only one VIN; that is, a VIN is unique for each vehicle data record as a vehicle can generally only have one current registration. A lien holder, however, may have provided liens for many vehicles. As a result, a lien holder may have associated with it several vehicle data records. In some embodiments, the risk analysis computer system 100 may generate a table or list of all lien holders based on the extracted lien information of the vehicle data records. The risk analysis computer system 100 may, in some embodiments, generate an association between the lien holders in the table or list and the one or more vehicle data records associated with the lien holder. Such an association may be stored in the data store 340 in order to optimize analysis.

Next, in block 430, the risk analysis computer system 100 requests vehicle history information from the vehicle history computer system 110. In one embodiment, block 430 is performed as risk analysis computer system receives vehicle data records from the vehicle registration computer systems 130. In other embodiments, block 430 may be performed on a periodic basis, such as daily, weekly, monthly, quarterly, yearly, or other frequency. In one embodiment, the risk analysis computer system 100 may request vehicle history data for one VIN. In other embodiments, vehicle history data may be requested for a batch of VINs. In some embodiments, identification of a vehicle other than a VIN may be used such as, for example, owner name, address, make, model, date of purchase, or the like.

Next, in block 440, the risk analysis computer system 100 receives the vehicle history data requested. In one embodiment, the vehicle history data includes adverse history events. An adverse history event is, as described above, an event that may adversely affect the value of a vehicle. For example, a title brand may be an event that adversely affects the value of the vehicle. It should be noted, however, that title brands are not the only adverse events that may be received from the vehicle history computer system 110. Adverse history events may include indications that the vehicle: had severe issues that resulted in the vehicle becoming inoperable, was described as a total loss by an insurance company, was rebuilt or salvaged, has had a broken odometer, has had inaccurate mileage, was a manufacturer buyback or lemon, was announced at auction as having a severe issue, has an identified odometer rollback, was reported in one or more accidents, etc. In some embodiments, the returned vehicle history data indicates all events associated with a vehicle whether they are adverse or non-adverse. In other embodiments, the returned vehicle history may include only adverse history events. In other embodiments the returned vehicle history may indicate only one adverse historical event.

In embodiments where the risk analysis computer system 100 receives more than one adverse history event, it may only associate and store in the data store 340 one adverse history event. The risk analysis computer system 100 may choose to store only the most recent history event, or in other embodiments, may choose to store the most severe history event. In some embodiments, the vehicle history computer system 110 may only return one adverse history event if a VIN has associated with it more than one adverse history event. The adverse history event may be the most recent, or the most severe adverse history event.

In one embodiment, the data that the risk analysis computer system 100 receives may be a string of letters and/or numbers indicating adverse history data associated with a VIN. The string of letters and/or numbers may, for example, include title branding information. Upon receipt, the risk analysis computer system 100 may parse the string in order to determine the VIN, brand code, date of branding event, state where the brand occurred and odometer reading at the time of the branding event. For example, portions of the string may correspond to the VIN, other portions of the string may correspond to the branding code indicating the type of branding event, other portions of the string may correspond to the date of the branding event, other portions may correspond to the state where the branding event was recorded and other portions of the string may correspond to odometer reading at the time of the branding event. The risk analysis computer system 100 may, after parsing and decoding the string, store the associated data values in the data store 340 in order to optimize analysis.

In some embodiments, the risk analysis computer system 100 may determine an expected value score of a vehicle. The expected value score may, for example, be a value between 0 and 100, where 100 represents a relatively valuable vehicle and a 0 represents a relatively valueless vehicle. The value score may be based at least in part on the adverse history events received in block 440 by the risk analysis computer system 100. For example, if an indication that a vehicle is inoperable is received, the risk analysis computer system 100 may assign an expected value score of about 0 to the vehicle. If no adverse history events are associated with a vehicle, the risk analysis computer system 100 may assign a value of about 100 to the vehicle. The expected value score of the vehicle may be also be based on the age, mileage, make, model, etc. of the vehicle. In some embodiments, the risk analysis computer system 100 may receive the expected value score of the vehicle from the vehicle history computer system 110.

Next, in block 450, the risk level of the lien holders, and/or indirect lenders, may be determined. In one embodiment, as indicated above, the vehicle registration data accessed by the risk analysis computer system 100 may include lien information. The lien information may include a lien holder identifier. Generally, lien holders are direct or indirect lenders of funds for purchasing a vehicle. In one embodiment, a risk level may be determined for the lien holder by dividing the number of registered vehicles for which the lien holder holds loans that have adverse history events by the total number of registered vehicles for which the lien holder holds loans. For example, suppose Al's Pre-Owned Cars granted loans on 100 cars it sold. Al's is the lien holder for all 100 cars. Of those 100 cars, 23 have adverse history events. Thus, a risk level associated with Al's may be 0.23 or 23%. In other embodiments, a risk score may be used to determine the risk level associated with a lien holder. The risk score may be determined based at least in part on the expected value scores of the vehicles for which the lien holder holds liens and may be the average of the expected value scores. For example, suppose Al's holds three liens for vehicles with expected value scores of 60, 70 and 90. A risk score of 73.3 may be associated with the vehicles for which Al's has provided loans.

In one embodiment, the risk analysis computer system 100 may generate a risk level for a lien holder representing all loans of the lien holder. For an overall risk level, every lien currently or historically held by a lien holder may be used to determine the risk level, which may be in some embodiments, a percentage, a risk score, or character string as described above. In other embodiments, only current liens or historic liens may be used to determine the risk level for a lien holder. In other embodiments, risk levels for a lien holder may be determined for liens created during a particular time period. For example, a risk level may be determined for a lien holder for vehicles registered in 2010. A risk level may alternatively be determined for all loans provided within a time period, such as for example, between May 2010 and December 2010. In other embodiments, risk levels may also be limited by liens covering vehicles within a particular geographic region, or for vehicles of a particular type, segment, make, model, or model year. For example, only those liens on cars registered within California may be used to determine the risk level of a lien holder.

Finally, in block 460, a report may be generated that indicates risk levels associated with lien holders. In one embodiment, the report may be generated based on parameters sent by the user computer system 120 to the risk analysis computer system 100. The parameters may include, for example: the lien holders for which risk should be analyzed, a time period for analyzing risk, a geographical region for analyzing risk, or the dealer (or lien holder) type for analyzing the risk. In one embodiment, the parameters may comprise an indication of the type of report risk analysis computer system may generate. For example, the report may be a market analysis report. A market analysis report may include the risk level of all lien holders within a particular market, of a particular type, for a particular time period or any combination of parameters. In another embodiment, a report may only detail risk levels associated with a particular lender, or lien holder. In another embodiment, the report may include risk levels for a portfolio of lien holders to which a financial institution or bank has loaned money. For example, Bank A may have loaned money to Car Dealer 1, Car Dealer 2 and Car Dealer 3 so that each car dealer may offer loans to individuals who purchase cars from them. The risk analysis computer system 100 may generate a report for Bank A including the risk levels of Car Dealer 1, Car Dealer 2 and Car Dealer 3. Bank A may wish to restrict the risk levels determined for each car dealer based on geography (such as within California), or for a particular time period (the year 2010) or for both (within the California for 2010).

Once generated, the risk analysis computer system 100 may transmit the report to the user computer system 120. The report may be generated as a web page and transmitted via the network 140 to the user computer system 120. In another embodiment, the report may be generated as a text file and transmitted to the user computer system 120. In another embodiment, the report may be generated in a custom format for display by a custom application running on the user computer system 120. The custom format may, for example, be an XML file, a serialized object or a data byte stream. In other embodiment, the report may be generated as an email, or attached to an email, and transmitted to the user computer system 120. The report may, in other embodiments, be generated a spreadsheet file, such a Microsoft Excel or Lotus 1-2-3 file.

In one embodiment, reports may be generated on an as needed basis. That is, the reports may only be generated when requested by the user computer system 120. In other embodiments, the risk analysis computer system 100 may generate the reports on a periodic basis, such as, for example, quarterly, and automatically send the reports to the user computer system 120. In another embodiment, the user computer system 120 may specify alert parameters that are transmitted to the risk analysis computer system 100 specifying when reports are to be generated. For example, the user computer system 120 may request that a lender specific report be generated when a lien holder's risk level falls below a threshold value. In another embodiment, the risk analysis computer system 100 may generate and transmit reports through any combination of on an as needed basis, a periodic basis, and an alert basis.

Figure 5:
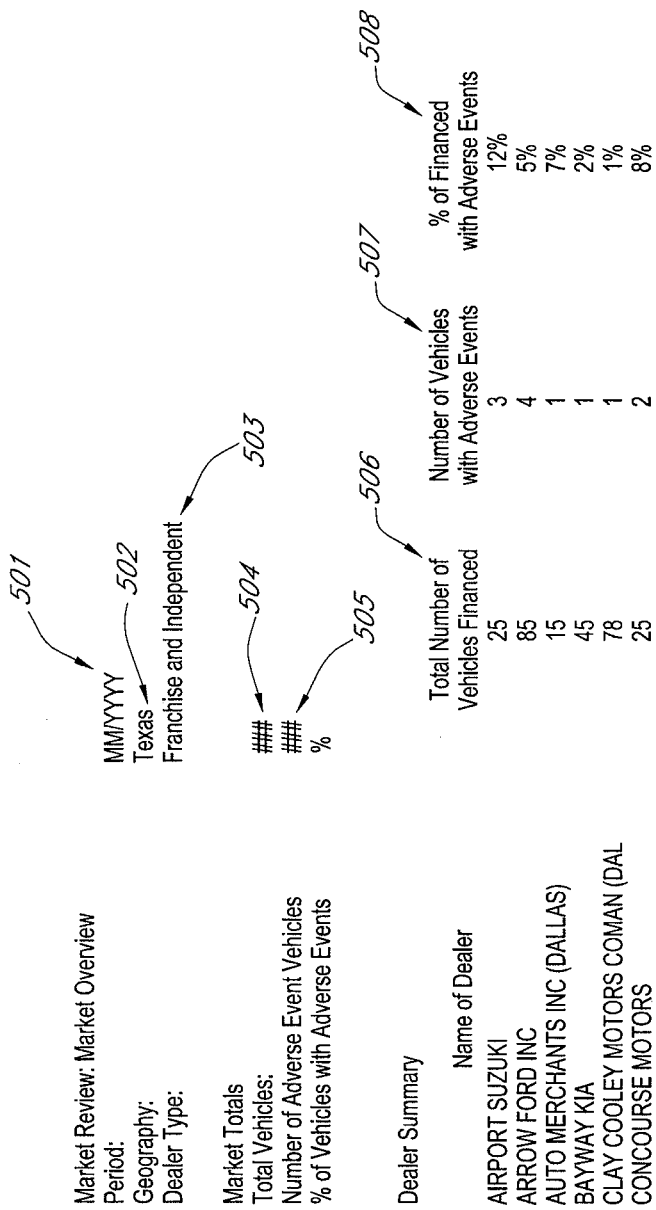

FIG. 5 is one embodiment of an example output report of the risk analysis computer system 100, specifically, a market overview report. In the embodiment of FIG. 5, the market overview report indicates risk levels associated with six lien holders of automotive loans. The report of FIG. 5 indicates a time period for the report 501, a geography for which the risk levels apply 502 and the type of dealers included in the market level report 503. The report of FIG. 5 indicates the total number for vehicles in the market 504 as well as the number of vehicles with adverse history events 505. The embodiment of FIG. 5 also details the total number of vehicles financed 506, the number of vehicles with adverse events 507, and the percentage of vehicles financed with adverse events 508.

Figure 6:
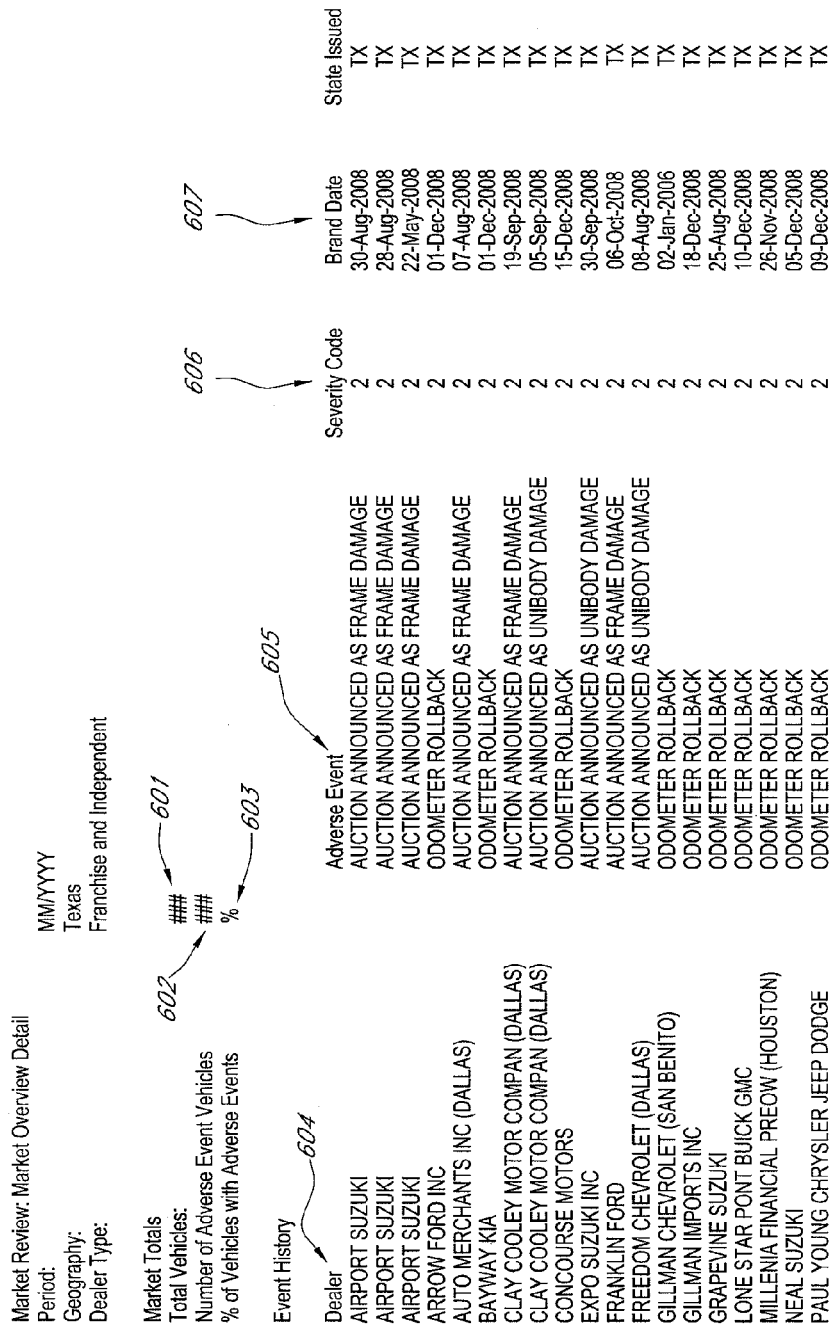

FIG. 6 is another embodiment of an example output report of the risk analysis computer system, specifically, a market detail report. The market detail report may, for example, indicate the details of the adverse history events associated with the lien holders, and/or indirect lenders in a particular market. For example, in the embodiment of FIG. 6, the market detail report includes details for lien holders holding liens in Texas. The embodiment of FIG. 6 also includes summary information for the market such as, for example, the total number of vehicles in the market 601, the number of vehicles in the market with adverse history events 602, and a percentage value indicating the percentage of vehicles with adverse events 603. The report of FIG. 6 indicates the name of the lien holder 604, the adverse event associated with the lien holder 605, and the Severity Code 606. In some embodiments, such as the embodiment of FIG. 6, a title brand may be associated with the adverse event. When a title brand is associated with the adverse event, a brand date 607 may be included in the report as shown in FIG. 6. In other embodiments, where a brand may not be associated with an adverse event, the brand date value may be empty, or in other embodiments, brand dates may not be included in the market detail report.

FIG. 7 is one embodiment of an example output report of the risk analysis computer system, specifically, a lender summary report. The report of FIG. 7 may be generated as a summary to banks or financial institutions so that they may quickly review the risk associated with their portfolio as a whole. The report may, in some embodiments, only include summary information for a particular geographic region. For example, the embodiment of FIG. 7 is a lender summary report for Texas. The summary report may also be restricted by a dealer, or lien holder type, such as for example franchise dealers, independent dealers, or, as in the example of FIG. 7, both franchise and independent dealers. The lender may, in some embodiments, include market summary information in addition to lender summary information.

FIG. 8 is one embodiment of an example output report of the risk analysis computer system, specifically, a lender activity report. The report of FIG. 8 provides summary information specific to each lien holder and/or indirect lender in a portfolio of a direct lender, such as a bank or financial institution. For example, the direct lender may, as in the example of FIG. 8, have several dealers in its portfolio. The report may include for each dealer in the portfolio the total number of transactions 801 as well as the total number of those transactions involving vehicles with adverse events 802. The report may further detail the number of those transactions for which loans had been granted 803, and the number of those transactions involving vehicles with adverse events 804. The lender activity report may be for all dealers in a portfolio, or, as in the example of FIG. 8, may be a report based on a geographic region, such as Texas, for example.

Figure 9:
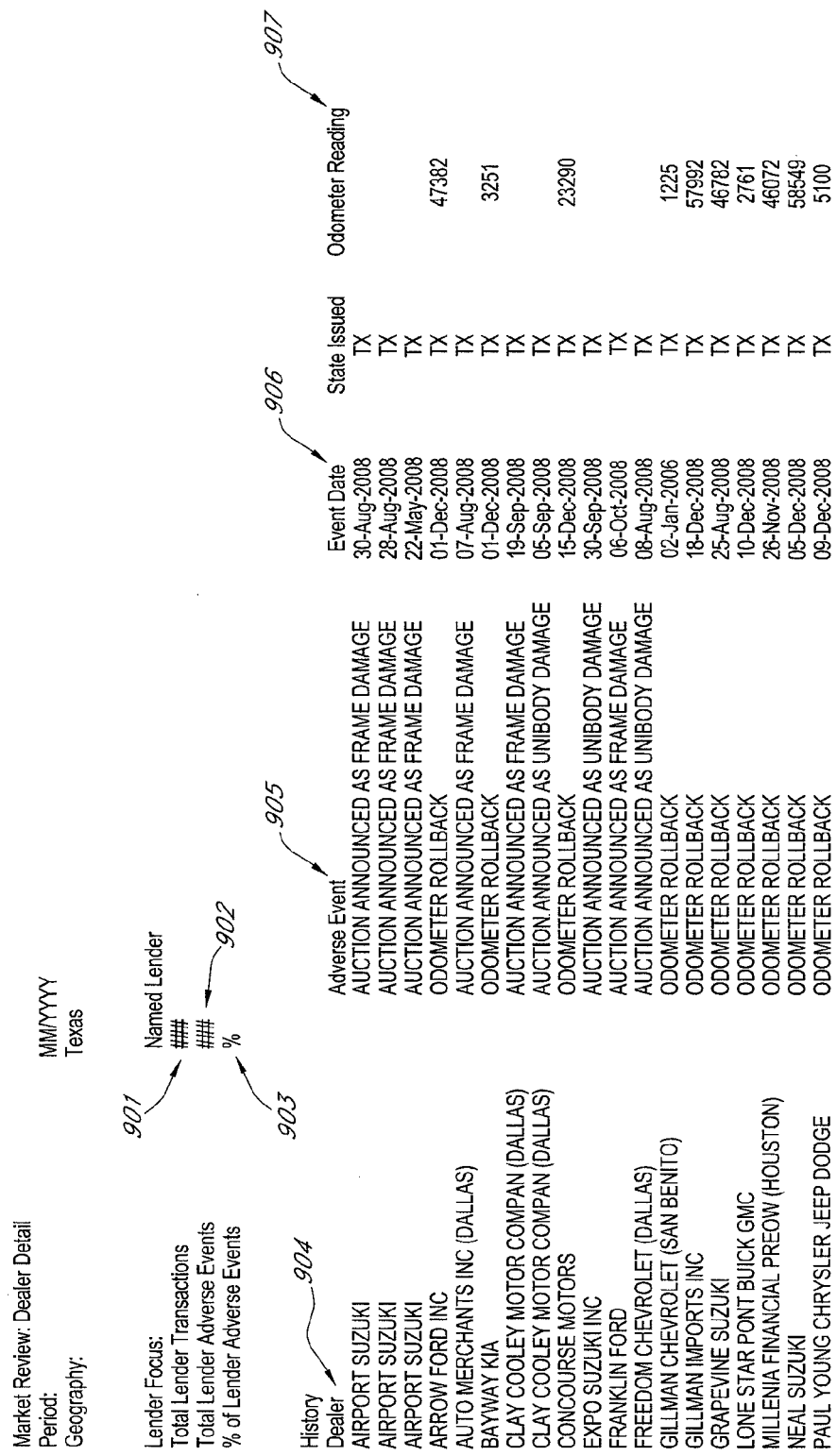

FIG. 9 is one embodiment of an example output report of the risk analysis computer system 100, specifically, a lender dealer detail report. The report of FIG. 9 may, for example, indicate the details of the adverse history events associated with the lien holders, and/or indirect lenders for which a bank of financial institution has in their portfolio. For example, in the embodiment of FIG. 9, the lender dealer detail report includes details for the lien holders holding liens in Texas that are part of the direct lender's portfolio. The embodiment of FIG. 9 also includes summary information for the direct lender such as, for example, the total number of transactions for the portfolio 901, the number of those transactions with adverse events 902, and a percentage value indicating the percentage of vehicles with adverse events 903. The report of FIG. 9 indicates the name of the indirect lender 904, the adverse event associated with the indirect lender 905, and the date of the adverse event 906. If odometer information is available, the last reported odometer reading 907 may be included in the lender detail report as shown in FIG. 9. In other embodiments, however, the odometer information may not be included.

All of the methods and tasks described herein may be performed and fully automated by a computer system. The computer system may in some cases include multiple distinct computers or computing devices (e.g., physical servers, workstations, storage arrays, etc.) that communicate and interoperate over a network to perform the described functions. Each such computing devices typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices such as solid state memory chips and/or magnetic disks, into a different state.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of determining the level of risk associated with a provider of vehicle loans comprising:
   receiving, by a processor, vehicle registration data comprising one or more vehicle data records comprising a unique vehicle identifier and lien information;
   determining, by the processor, a provider of vehicle loans associated with the one or more vehicle data records based at least on the lien information of the one or more vehicle data records;
   extracting the unique vehicle identifier from the one or more vehicle data records;
   receiving, by the processor, vehicle history data based on the unique vehicle identifier of the one or more vehicle data records;
   determining, based on the accessed vehicle history data, adverse history events associated with the unique vehicle identifier of the one or more vehicle data records;
   determining, by the processor, the provider of vehicle loans associated with the adverse history events associated with the unique vehicle identifier based on the unique vehicle identifier; and,
   determining, by the processor, a risk level for the provider of vehicle loans based upon the determined adverse history events associated with the unique vehicle identifier that is associated with the provider of vehicle loans, wherein the risk level comprises a ratio of a number of vehicles for which the provider of vehicle loans holds loans with adverse history events to a number of vehicles for which the provider of vehicle loans holds loans.

2. The method of claim 1, further comprising generating a report comprising the determined risk level.

3. The method of claim 2 wherein the report comprises the risk levels of one or more providers of vehicle loans within a geographic region.

4. The method of claim 2 wherein the report comprises the risk levels of one or more providers of vehicle loans associated with a financial institution, wherein the financial institution has loaned money to the providers of vehicle loans.

5. The method of claim 2 wherein the report comprises an indicator of the type of adverse history event associated with the provider of vehicle loans.

6. The method of claim 2 wherein the report type is one of a market report or a financial institution portfolio report.

7. The method of claim 1 wherein the risk level comprises a percentage.

8. The method of claim 1 further comprising:
   generating, by the processor, a user interface for entering report parameters;
   accessing entered report parameters;
   generating, by the processor, a report based on the entered report parameters.

9. The method of claim 8 wherein the report parameters comprise a report type.

10. A system comprising:
    one or more processors configured to execute software instructions;
    a computer readable medium storing software instructions executable by the one or more processors in order to cause the computing system to perform operations comprising:
       accessing vehicle registration data comprising one or more vehicle data records comprising a unique vehicle identifier and lien information;
       determining a provider of vehicle loans associated with one more vehicle data records based at least on the lien information of the one or more vehicle data records;
       accessing vehicle history data based on the unique vehicle identifier of the one more vehicle data records;
       determining, based on the vehicle history data, adverse history events associated with the unique vehicle identifier;
       determining the provider of vehicle loans associated with the adverse history events associated with the unique vehicle identifier; and,
       determining a risk level for the provider of vehicle loans based upon the determined adverse history events associated with the unique vehicle identifier that is associated with the provider of vehicle loans, wherein the risk level comprises a ratio of a number of vehicles for which the provider of vehicle loans holds loans with adverse history events to a number of vehicles for which the provider of vehicle loans holds loans.

11. The system of claim 10, wherein the operations further comprise generating a report comprising the determined risk level.

12. The system of claim 11 wherein the report comprises the risk levels of one or more providers of vehicle loans within a geographic region.

13. The system of claim 11 wherein the report comprises the risk levels of one or more providers of vehicle loans associated with a financial institution, wherein the financial institution has loaned money to the providers of vehicle loans.

14. The system of claim 11 wherein the report comprises an indicator of the type of adverse history event associated with the provider of vehicle loans.

15. The system of claim 10 wherein the risk level comprises a percentage.

16. The system of claim 10, wherein the operations further comprise:
    generating a user interface for entering report parameters;
    accessing entered report parameters;
    generating a report based on the entered report parameters.

17. The system of claim 16 wherein the report parameters comprise a report type.

18. The system of claim 17 wherein the report type is one of a market report or a financial institution portfolio report.

19. An apparatus of generating finance data reports comprising:
- means for receiving vehicle registration data comprising a vehicle data record comprising a unique vehicle identifier and lien information;
- means for determining a provider of vehicle loans from the lien information of the vehicle data record;
- means for determining the provider of vehicle loans associated with the vehicle data record;
- means for extracting the unique vehicle identifier from the vehicle data record;
- means for receiving vehicle history data identifying adverse history events associated with the unique vehicle identifier, based on the unique vehicle identifier;
- means for generating a report comprising an indication of the provider of vehicle loans, the unique vehicle identifier and the adverse history event associated with the unique vehicle identifier, wherein the indication comprises a ratio of a number of vehicles for which the provider of vehicle loans holds loans with adverse history events to a number of vehicles for which the provider of vehicle loans holds loans.

20. The apparatus of claim 19, wherein the report comprises the risk levels of one or more providers of vehicle loans associated with a financial institution, wherein the financial institution has loaned money to the providers of vehicle loans.

\* \* \* \* \*